US011094053B2

(12) United States Patent
Yati

(10) Patent No.: US 11,094,053 B2
(45) Date of Patent: Aug. 17, 2021

(54) DEEP LEARNING BASED ADAPTIVE REGIONS OF INTEREST FOR CRITICAL DIMENSION MEASUREMENTS OF SEMICONDUCTOR SUBSTRATES

(71) Applicant: KLA-Tencor Corporation, Milpitas, CA (US)

(72) Inventor: Arpit Yati, Lucknow (IN)

(73) Assignee: KLA Corporation, Milpitas, CA (US)

( * ) Notice: Subject to any disclaimer, the term of this patent is extended or adjusted under 35 U.S.C. 154(b) by 151 days.

(21) Appl. No.: 16/420,408

(22) Filed: May 23, 2019

(65) Prior Publication Data
US 2020/0111206 A1 Apr. 9, 2020

Related U.S. Application Data

(60) Provisional application No. 62/770,712, filed on Nov. 21, 2018.

(51) Int. Cl.
*G06K 9/62* (2006.01)
*G06T 7/00* (2017.01)
*G06T 7/60* (2017.01)

(52) U.S. Cl.
CPC .......... *G06T 7/0006* (2013.01); *G06K 9/6256* (2013.01); *G06K 9/6267* (2013.01); *G06T 7/60* (2013.01); *G06T 2207/10061* (2013.01); *G06T 2207/20004* (2013.01); *G06T 2207/20081* (2013.01); *G06T 2207/20084* (2013.01);
(Continued)

(58) Field of Classification Search
CPC ........ G06T 7/0002–7/001; G06T 2207/30148; G06T 2207/30108–2207/30164; G06T 2207/20104; G06T 2207/20081; G06T 2207/20084; G06N 3/02–3/105
See application file for complete search history.

(56) References Cited

U.S. PATENT DOCUMENTS 9,892,500 B2 2/2018 Lee et al.
2014/0105482 A1 4/2014 Wu et al.
(Continued)

FOREIGN PATENT DOCUMENTS

JP 2010129599 A 6/2010
KR 20180001954 A 1/2018

OTHER PUBLICATIONS

International Search Report dated Jan. 16, 2020 for PCT/US2019/053922.

*Primary Examiner* — Brian Werner
(74) *Attorney, Agent, or Firm* — Suiter Swantz pc llo

(57) ABSTRACT

A metrology system is disclosed. In one embodiment, the system includes a characterization sub-system configured to acquire one or more images of a specimen. In another embodiment, the system includes a controller configured to: receive one or more training images of a specimen from the characterization sub-system; receive one or more training region-of-interest (ROI) selections within the one or more training images; generate a machine learning classifier based on the one or more training images and the one or more training ROI selections; receive one or more product images of a specimen from the characterization sub-system; generate one or more classified regions of interest with the machine learning classifier; and determine one or more measurements of the specimen within the one or more classified regions of interest.

18 Claims, 13 Drawing Sheets

(52) U.S. Cl.
CPC ............... *G06T 2207/20104* (2013.01); *G06T 2207/30148* (2013.01)

(56) References Cited

U.S. PATENT DOCUMENTS

2016/0372303 A1 12/2016 Park et al.
2019/0147283 A1* 5/2019 Giering ................ G06K 9/4604
382/103

* cited by examiner

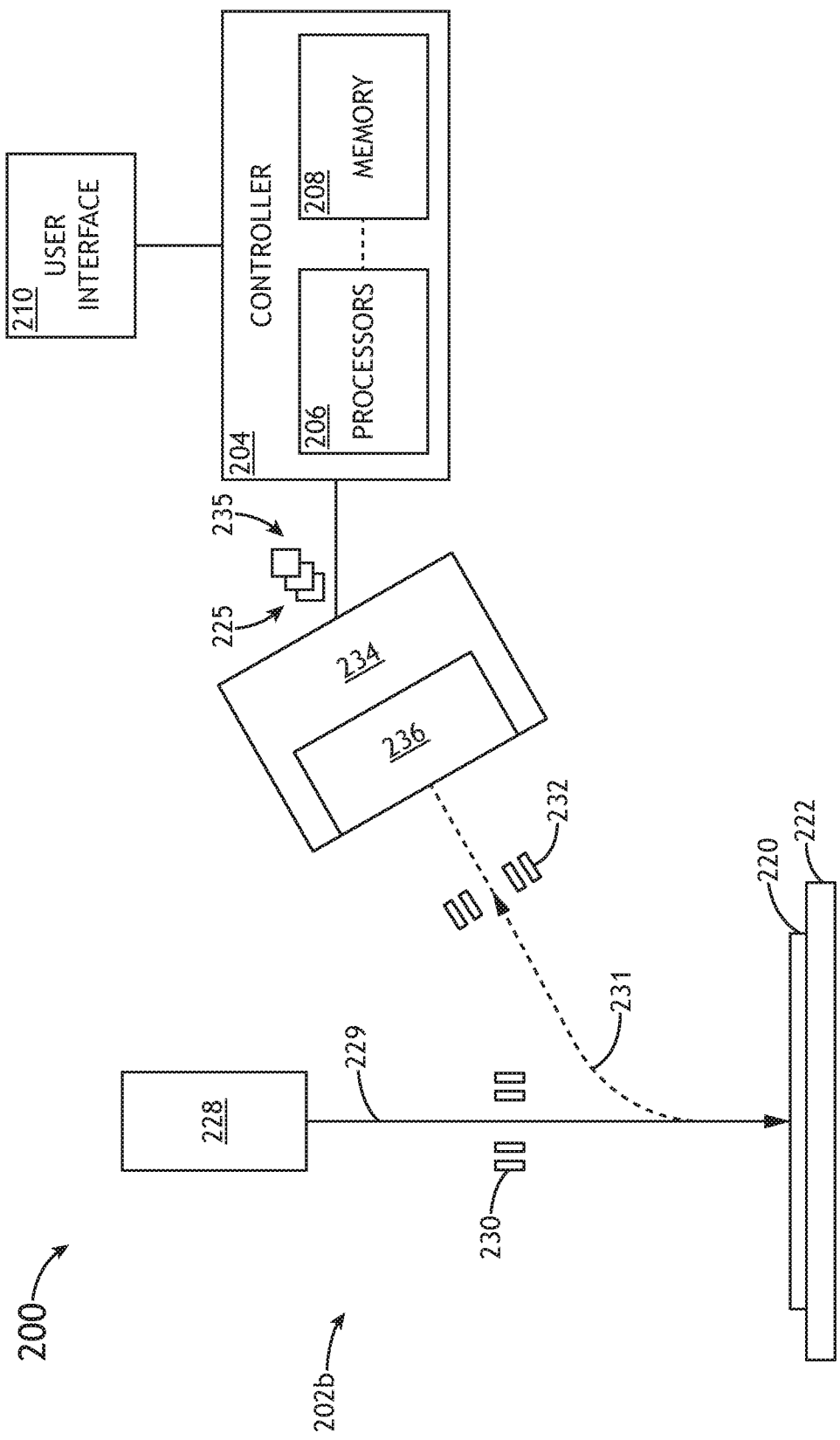

DEEP LEARNING BASED ADAPTIVE REGIONS OF INTEREST FOR CRITICAL DIMENSION MEASUREMENTS OF SEMICONDUCTOR SUBSTRATES

CROSS-REFERENCE TO RELATED APPLICATION

The present application claims the benefit under 35 U.S.C. § 119(e) of U.S. Provisional Application Ser. No. 62/770,712, filed Nov. 21, 2018, entitled DEEP LEARNING BASED ADAPTIVE REGIONS OF INTEREST FOR CRITICAL DIMENSION MEASUREMENTS OF SEMICONDUCTOR SUBSTRATES, naming Arpit Yati as inventor, which is incorporated herein by reference in the entirety. The present application also claims priority to India Provisional Patent Application No. 201841037993, filed Aug. 10, 2018, entitled DEEP LEARNING BASED ADAPTIVE REGIONS OF INTEREST FOR CRITICAL DIMENSION MEASUREMENTS OF SEMICONDUCTOR STRUCTURES, naming Arpit Yati as inventor, which is incorporated herein by reference in the entirety.

TECHNICAL FIELD

The present invention generally relates to the fields of specimen characterization and metrology and, more particularly, to a system and method for adaptive region of interest selection using machine learning techniques.

BACKGROUND

Demand for electronic logic and memory devices with ever-smaller footprints and features present a wide range of manufacturing challenges beyond fabrication at a desired scale. Increasingly complex structures result in increasing numbers of parameters which must be monitored and controlled to maintain device integrity. One important characteristic in the field of semiconductor fabrication is critical dimension uniformity (CDU) and the critical dimension(s) (CD) of device features. Monitoring CDU may help with monitoring process variations and identify process tool drift which needs to be fixed.

Traditionally, monitoring features of interest (e.g., CDU) involves defining patterns of interest (POIs), defining a region of interest (ROI) relative to the POIs within which a measurement (e.g., CDU measurement) is to be made, detecting the edges of the ROI, and performing the measurement. However, because current techniques involve aligning POIs with scanning electron microscopy (SEM) images and placing ROIs based on the POI location, the accuracy of the ROI placement is dependent upon SEM-to-SEM alignment, which may not be reliable. Furthermore, alignment accuracy is often low because the defined POI structure size within each image may vary considerably. Due to this misalignment, ROIs may be mis-placed, and thereby fail to include the entire region required for a particular measurement of interest.

Additionally, current techniques are not able to correct for process variations and/or structural variations which may affect alignment accuracy. Therefore, POI alignment within an SEM image, and therefore ROI alignment, may fail due to structural variations within the specimen itself. For example, target structure size variations may result in POI and ROI alignment failure, thereby preventing efficient monitoring of measurements of interest.

Therefore, it would be desirable to provide a system and method that cure the shortfalls of the previous approaches identified above.

SUMMARY

A system is disclosed, in accordance with one or more embodiments of the present disclosure. In one embodiment, the system includes a characterization sub-system configured to acquire one or more images of a specimen. In another embodiment, the system includes a controller including one or more processors configured to execute a set of program instructions stored in memory, the set of program instructions configured to cause the one or more processors to: receive one or more training images of a specimen from the characterization sub-system; receive one or more training region-of-interest (ROI) selections within the one or more training images; generate a machine learning classifier based on the one or more training images and the one or more training ROI selections; receive one or more product images of a specimen from the characterization sub-system; generate one or more classified regions of interest with the machine learning classifier; and determine one or more measurements of the specimen within the one or more classified regions of interest.

A system is disclosed, in accordance with one or more embodiments of the present disclosure. In one embodiment, the system includes a controller including one or more processors configured to execute a set of program instructions stored in memory, the set of program instructions configured to cause the one or more processors to: receive one or more training images of a specimen; receive one or more training region-of-interest (ROI) selections within the one or more training images; generate a machine learning classifier based on the one or more training images and the one or more training ROI selections; receive one or more product images of a specimen; generate one or more classified regions of interest with the machine learning classifier; and determine one or more measurements of the specimen within the one or more classified regions of interest.

A method is disclosed, in accordance with one or more embodiments of the present disclosure. In one embodiment, the method includes: acquiring one or more training images of a specimen with a characterization sub-system; receiving one or more training region-of-interest (ROI) selections within the one or more training images; generating a machine learning classifier based on the one or more training images and the one or more training ROI selections; acquiring one or more product images of a specimen with the characterization sub-system; generating one or more classified regions of interest with the machine learning classifier; and determining one or more measurements of the specimen within the one or more classified regions of interest.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which:

FIG. 6B illustrates a system for adaptive region of interest (ROI) selection, in accordance with one or more embodiments of the present disclosure.

DETAILED DESCRIPTION

Figure 1:
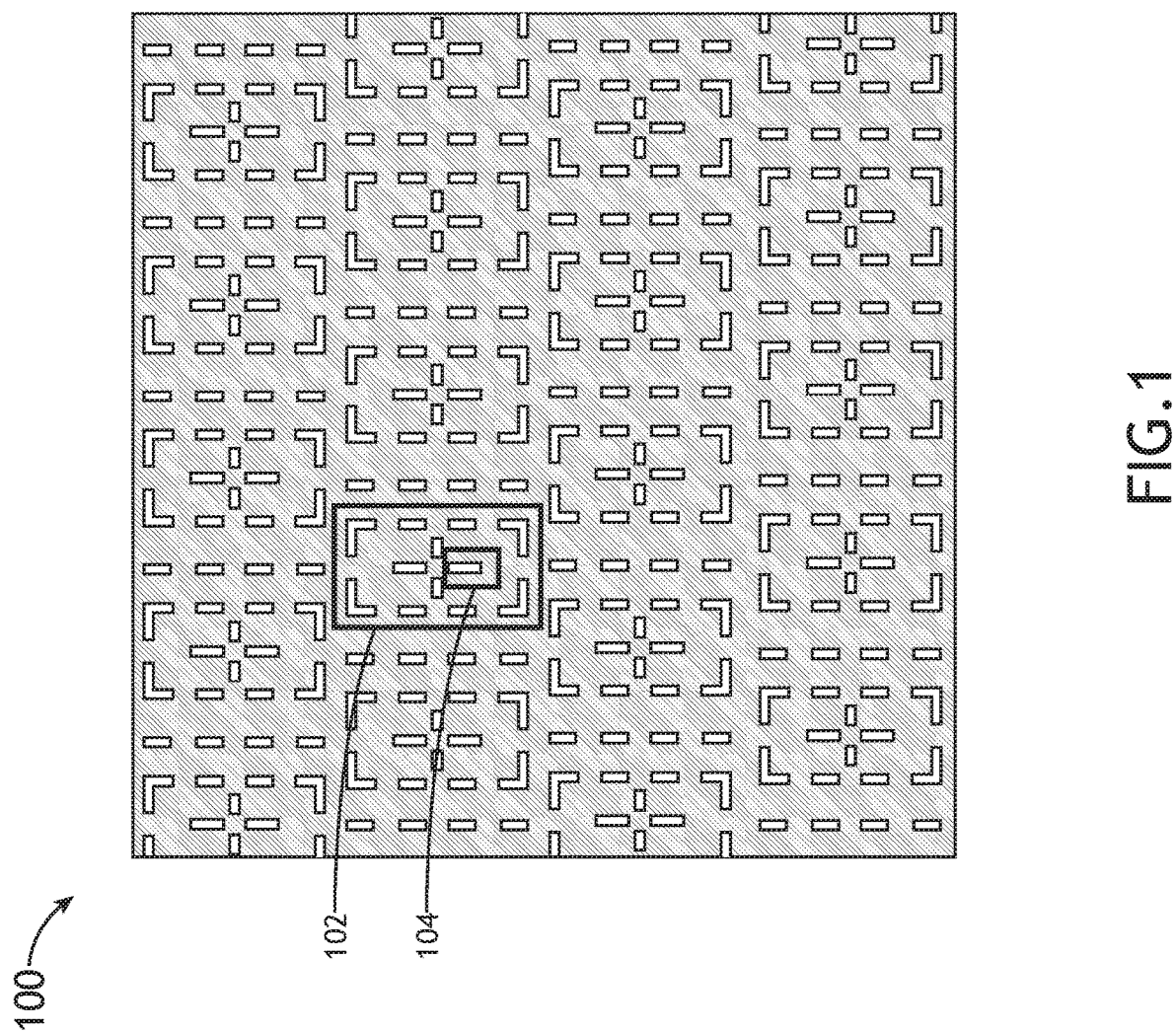
FIG. 1 illustrates pattern of interest (POI) and region of interest (ROI) alignment on a specimen.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Reference will now be made in detail to the subject matter disclosed, which is illustrated in the accompanying drawings.

It is noted herein that monitoring features of interest, including critical dimension uniformity (CDU), is an important step in monitoring process variations during semiconductor fabrication. Traditionally, monitoring features of interest (e.g., CDU) are based on conventional image processing procedures and involve the following steps: (1) defining patterns of interest (POIs), (2) defining a region of interest (ROI) relative to the POIs within which a measurement (e.g., CDU measurement) is to be made, (3) defining which measurement is to be made (e.g., CDU measurement, pattern width, contact, and the like), (4) detecting the edges of each ROI, and (5) performing the measurement. However, because current techniques involve aligning POIs with scanning electron microscopy (SEM) images and placing ROIs based on the POI location, the accuracy of the ROI placement is dependent upon SEM-to-SEM alignment, which may not be reliable. Furthermore, alignment accuracy is often low because the defined POI structure size within each image may vary considerably. Due to this misalignment, ROIs may be mis-placed, and thereby fail to include the entire region required for a particular measurement of interest.

Additionally, current ROI placement techniques based on conventional image processing procedures are not able to correct for process variations which may affect alignment accuracy. Therefore, POI alignment within an SEM image, and therefore ROI alignment, may fail due to structural variations within the specimen itself. For example, target structure size variations may result in POI and ROI alignment failure, thereby preventing efficient monitoring of measurements of interest.

Accordingly, embodiments of the present disclosure are directed to curing one or more shortfalls of the previous approaches identified above. Embodiments of the present disclosure are directed to a system and method for generating adaptive regions of interest (ROIs) using machine learning techniques. More particularly, embodiments of the present disclosure are directed to using machine learning techniques to generate adaptive ROIs in order to more effectively monitor features of interest.

The various shortfalls of previous approaches based on conventional image processing procedures, as well as the significance of embodiments of the present disclosure, may be further understood with reference to FIGS. 1-4B. It is contemplated herein that a brief discussion of traditional approaches may serve as a benchmark against which the advantages of the present disclosure may be compared.

FIG. 1 illustrates pattern of interest (POI) and region of interest (ROI) alignment on a specimen.

As noted previously herein, in the first step of traditional feature of interest monitoring using conventional image processing procedures, a POI 102 is defined/selected on a control image 100 of a specimen, as may be seen in FIG. 1. The POI 102 may be drawn on any control image 100 including a design image of the specimen, an optical image, an SEM image, and the like. The POI 102 defines an area of specimen within which a measurement is to be made, and serves as an anchor point for ROI 104 placement. The POI 102 may include a unique pattern, a unit of a repeating structure, or the like. Following POI 102 selection, the ROI 104 is then selected on the control image 100 of the specimen within the area defined by the POI 102. The ROI 104 defines an area of the specimen within which the measurement is to be made. In practice, POI 102 and ROI 104 selection shown in FIG. 1 may be carried out on a design image of a specimen (e.g., control image 100).

After POI 102 and ROI 104 selection, a product image of a specimen is taken, and the POI 102 defined in the first step is identified and aligned in the product image. The product image taken in the second step is a different image from the control image 100 in which the POI 102 and ROI 104 were defined, and may include an image of a product specimen. The product image may include any image known in the art including, but not limited to, an optical image, a SEM image, and the like. After the POI 102 has been aligned in the product image, the ROI 104 is placed within the product image according to the placement of the POI 102. In this regard, the alignment accuracy of the POI 102 may directly affect the alignment accuracy of the ROI 104. Thus, the accuracy of the ROI 104 placement is dependent upon SEM-to-SEM alignment, which may not be reliable. Furthermore, alignment accuracy is often low because the defined POI 102 structure size within each image may vary considerably, thereby causing ROIs 104 to be m is-placed.

Following POI 102 and ROI 104 alignment in a product image, a measurement type may be defined. This may be further understood with reference to FIG. 2.

Figure 2:
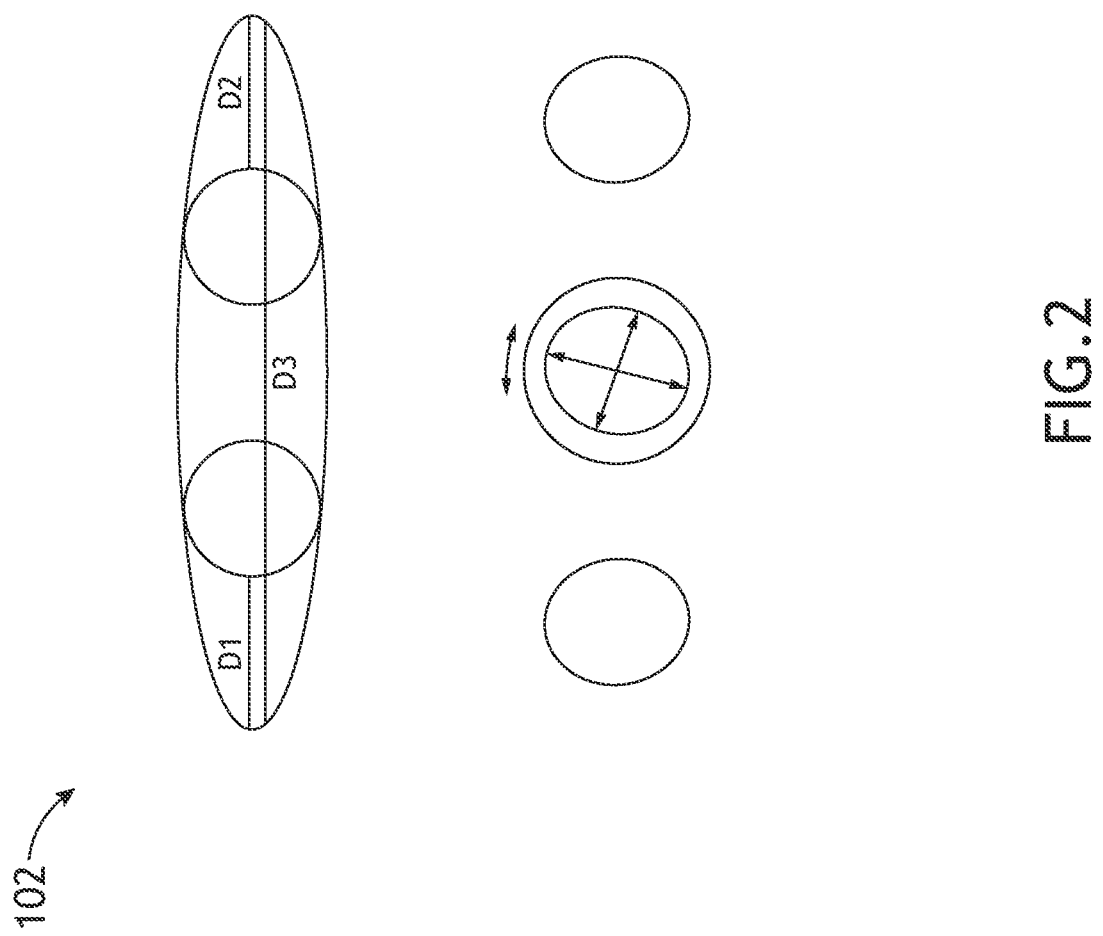
FIG. 2 illustrates a pattern of interest (POI) including a target site.

FIG. 2 illustrates a pattern of interest (POI 102) including a target site. The target site to be measured may include the measurement of interest defined as D4. The measurement D4 may include a critical dimension (CD) measurement, and may be defined by the expression $$D4 = \frac{D3 - (D1 + D2)}{2}.$$

It is noted herein that traditional ROI placement techniques using conventional image processing procedures may suffer from alignment errors attributable to process variations during the specimen fabrication process. With shrinking design rules, even small process variations may lead to large structural variations of specimen. This may then lead to alignment inaccuracies and alignment failures, thereby causing inaccurate placement of ROIs within an image. These process variations and resulting alignment inaccuracies are especially problematic during ramp-up periods in the semiconductor fabrication process. During ramp-up periods, structures may vary considerably in shape, size, orientation, and the like. This may in turn lead to alignment inaccuracies for POI/ROI placement between a control image and a product image.

Figure 3B:
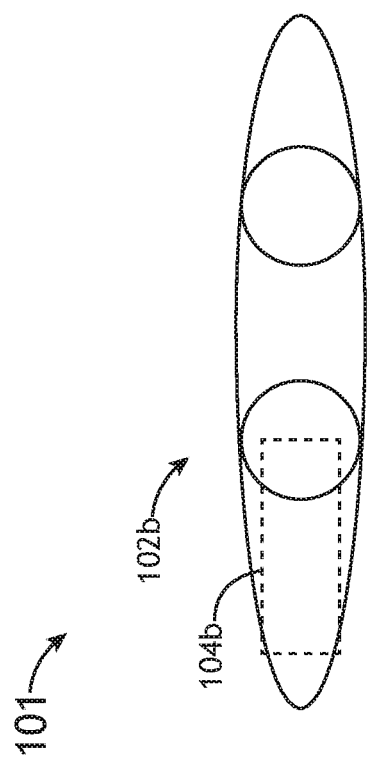
FIGS. 3A-3B illustrate an alignment error between a region of interest (ROI) of a product image and a region of interest (ROI) of a control image.
Figure 3A:
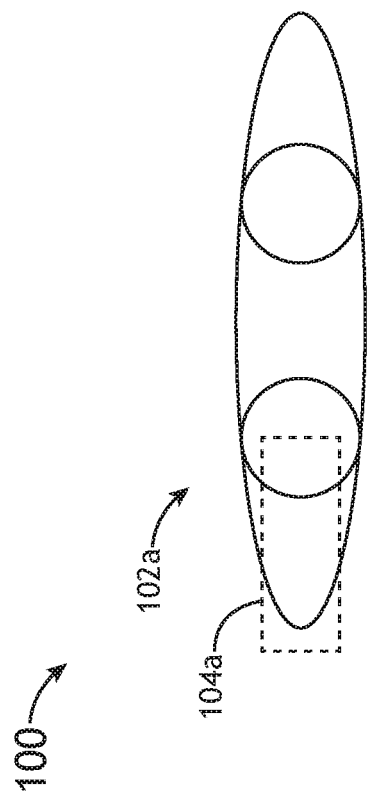

FIGS. 3A-3B illustrate an alignment error between a region of interest (ROI 104b) of a product image 101 and a region of interest (ROI 104a) of a control image 100.

Using traditional POI/ROI placement techniques based on conventional image processing procedures, a user may desire to perform one or more measurements on product specimens within the left "lobe" illustrated in FIG. 3A, and may thereby define the left lobe as the target site at issue. In this regard, the target site may include one or more "measurements of interest," which may include any parameter which may be measured including, but not limited to, a critical dimension (CD) measurement. Using traditional techniques, a user may define the ROI 104a within a control image 100, wherein the ROI 104a is located within the POI 102a and includes the target site including the one or more measurements of interest. Subsequently, a product image 101 may be taken, as shown in FIG. 3B.

As shown in FIG. 3B, one or more process variations in the layer including the target site may result in an enlarged target site (e.g., enlarged left lobe). This structural variation between the target site of the product image 101 and the target site of the control image 100 may lead to alignment inaccuracies, and incorrect ROI 104b placement. For example, the POI 102b of the product image 101 may be aligned with the POI 102a of the control image 100, and the ROI 104b of the product image 101 may be placed according to the placement of the POI 102b within the product image 101. As may be seen in FIG. 3B, the placement of the ROI 104b may be inaccurate in that it fails to encompass the target site (e.g., the left lobe). Due to the fact that the ROI 104b does not include the entirety of the target site, the desired measurements of interest within the target site may not be able to be acquired. Accordingly, under the traditional approach, conventional image processing procedures and alignment techniques are not capable of accounting for the process variation resulting in structural variations (e.g., enlarged left lobe).

Figure 4B:
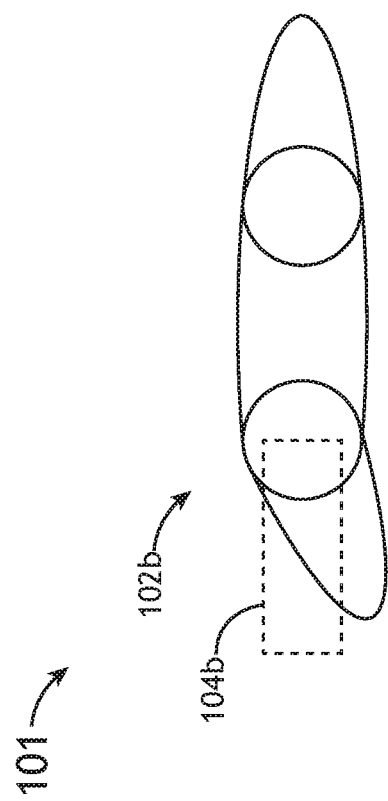
FIG. 4A-4B illustrate an alignment error between a region of interest (ROI) of a product image and a region of interest (ROI) of a control image.
Figure 4A:
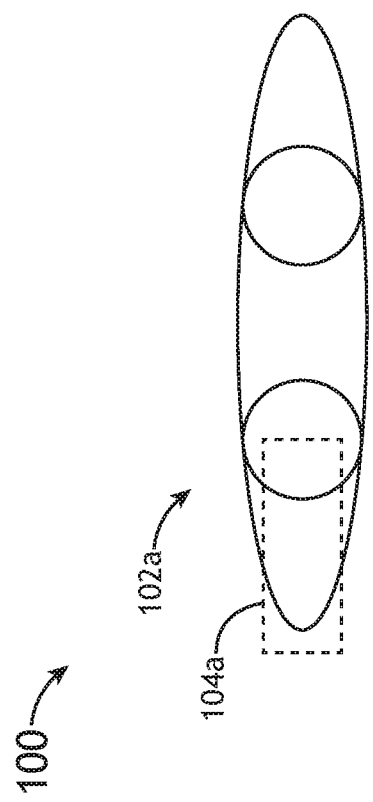

FIG. 4A-4B illustrate an additional example of an alignment error between a region of interest (ROI 104b) of a product image 101 and a region of interest (ROI 104a) of a control image 100.

Similarly to the previous example, a user may desire to perform one or more measurements on product specimens within the left "lobe" illustrated in FIG. 4A, and may thereby define the left lobe as the target site at issue. Using traditional techniques, a user may define the ROI 104a within a control image 100, wherein the ROI 104a is located within the POI 102a and includes the target site. Subsequently, a product image 101 may be taken, as shown in FIG. 4B.

As shown in FIG. 4B, one or more process variations in the layer including the target site may result in a thin and/or shifted target site (e.g., left lobe). This structural variation between the target site of the product image 101 and the target site of the control image 100 may lead to alignment inaccuracies, and incorrect ROI 104b placement. For example, the POI 102b of the product image 101 may be aligned with the POI 102a of the control image 100, and the ROI 104b of the product image 101 may be placed according to the placement of the POI 102b within the product image 101. As may be seen in FIG. 4B, the placement of the ROI 104b may be inaccurate in that it fails to encompass the target site (e.g., the left lobe) including the measurements of interest. Therefore, conventional image processing procedures relying on alignment techniques may fail to accurately place the ROI 104b in the product image 101. This may result in the inability to perform the desired measurements of the target site.

As noted previously herein, embodiments of the present disclosure are directed to a system and method for generating adaptive regions of interest (ROIs) using machine learning techniques. More particularly, embodiments of the present disclosure are directed to using machine learning techniques to generate adaptive ROIs in order to more effectively monitor features of interest. It is contemplated herein that embodiments of the present disclosure may allow for the accurate placement of ROIs despite the existence of process and/or structural variations.

Figure 5:
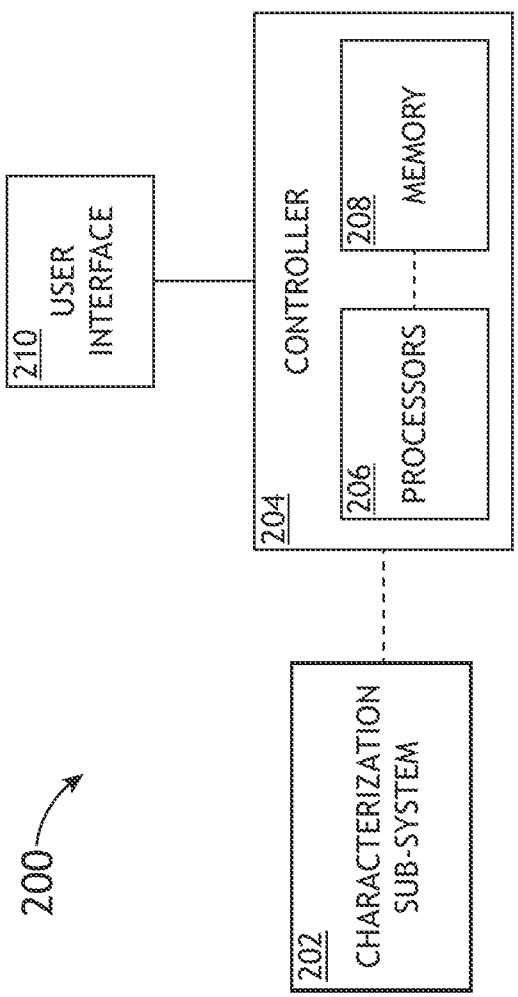
FIG. 5 illustrates a system for adaptive region of interest (ROI) selection, in accordance with one or more embodiments of the present disclosure.

FIG. 5 illustrates a system 200 for adaptive region of interest (ROI) selection, in accordance with one or more embodiments of the present disclosure. The system 200 may include, but is not limited to, one or more characterization sub-systems 202. The system 200 may additionally include, but is not limited to, a controller 204 including one or more processors 206 and a memory 208, and a user interface 210.

The characterization sub-system 202 may include any characterization sub-system 202 known in the art including, but not limited to, an optical-based characterization system, a charged particle-based characterization system, and the like. For example, the characterization sub-system 202 may include a scanning electron microscopy (SEM) characterization system. In one embodiment, the controller 204 is communicatively coupled to the one or more characterization sub-systems 202. In this regard, the one or more processors 206 of the controller 204 may be configured to generate one or more control signals configured to adjust one or more characteristics of the characterization sub-system 202.

Figure 6A:
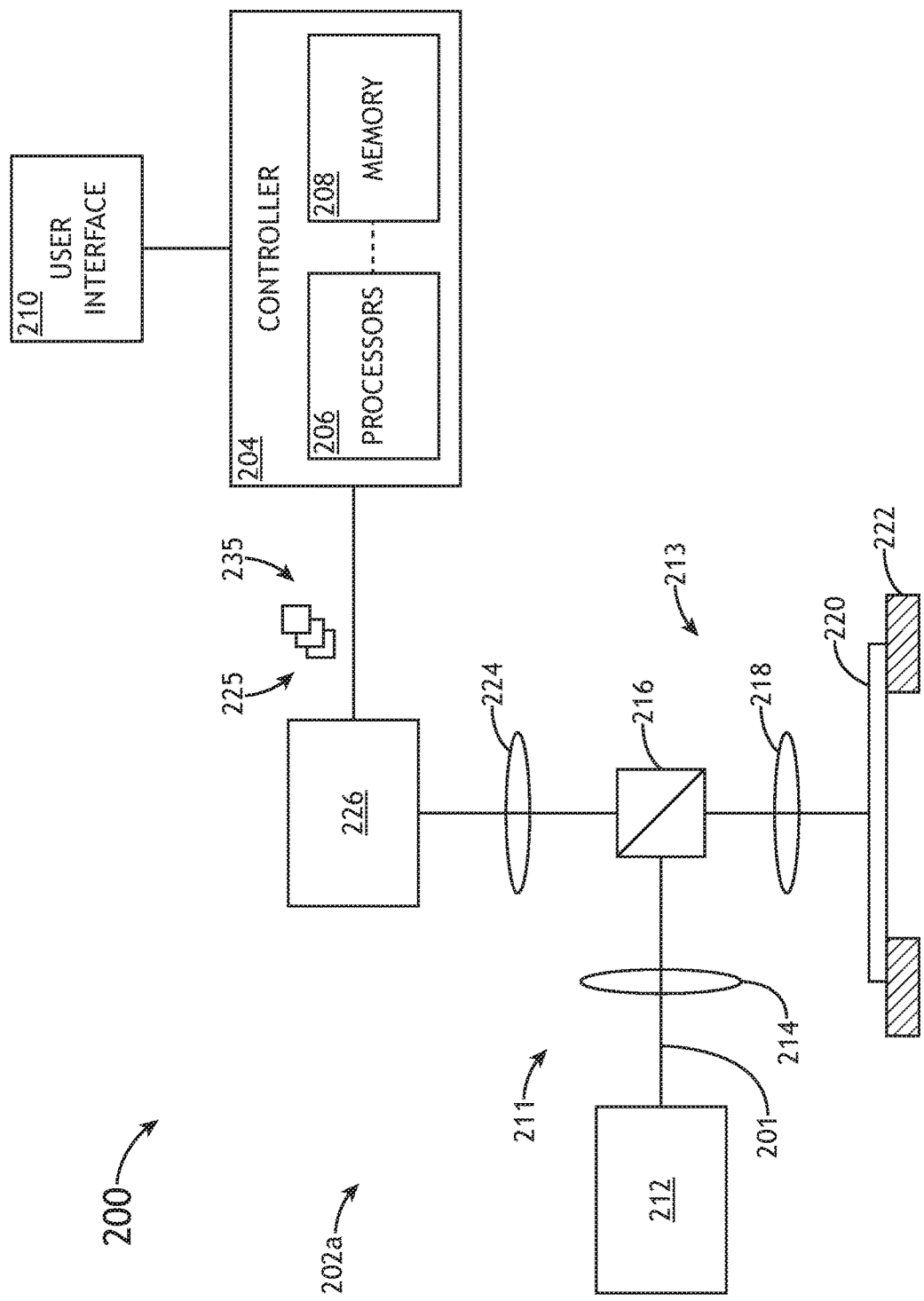
FIG. 6A illustrates a system for adaptive region of interest (ROI) selection, in accordance with one or more embodiments of the present disclosure.

FIG. 6A illustrates a system 200 for adaptive region of interest (ROI) selection, in accordance with one or more embodiments of the present disclosure. In particular, FIG. 6A illustrates a system 200 including an optical characterization sub-system 202a.

The optical characterization sub-system 202a may include any optical-based characterization system known in the art including, but not limited to, an image-based metrology tool. For example, the characterization sub-system 202a may include an optical critical dimension metrology tool. The optical characterization sub-system 202a may include, but is not limited to, an illumination source 212, an illumination arm 211, a collection arm 213, and a detector assembly 226.

In one embodiment, optical characterization sub-system 202a is configured to inspect and/or measure the specimen 220 disposed on the stage assembly 222. Illumination source 212 may include any illumination source known in the art for generating illumination 201 including, but not limited to, a broadband radiation source. In another embodiment, optical characterization sub-system 202a may include an illumination arm 211 configured to direct illumination 201 to the specimen 220. It is noted that illumination source 212 of optical characterization sub-system 202a may be configured in any orientation known in the art including, but not limited to, a dark-field orientation, a light-field orientation, and the like.

Specimen 220 may include any specimen known in the art including, but not limited to, a wafer, a reticle, a photomask, and the like. In one embodiment, specimen 220 is disposed on a stage assembly 222 to facilitate movement of specimen 220. In another embodiment, the stage assembly 222 is an actuatable stage. For example, the stage assembly 222 may include, but is not limited to, one or more translational stages suitable for selectably translating the specimen 220 along one or more linear directions (e.g., x-direction, y-direction and/or z-direction). By way of another example, the stage assembly 222 may include, but is not limited to, one or more rotational stages suitable for selectively rotating the specimen 220 along a rotational direction. By way of another example, the stage assembly 222 may include, but is not limited to, a rotational stage and a translational stage suitable for selectably translating the specimen 220 along a linear direction and/or rotating the specimen 220 along a rotational direction. It is noted herein that the system 200 may operate in any scanning mode known in the art.

The illumination arm 211 may include any number and type of optical components known in the art. In one embodiment, the illumination arm 211 includes one or more optical elements 214, a beam splitter 216, and an objective lens 218. In this regard, illumination arm 211 may be configured to focus illumination 201 from the illumination source 212 onto the surface of the specimen 220. The one or more optical elements 214 may include any optical elements known in the art including, but not limited to, one or more mirrors, one or more lenses, one or more polarizers, one or more beam splitters, and the like.

In another embodiment, optical characterization sub-system 202a includes a collection arm 213 configured to collect illumination reflected or scattered from specimen 220. In another embodiment, collection arm 213 may direct and/or focus the reflected and scattered light to one or more sensors of a detector assembly 226 via one or more optical elements 224. The one or more optical elements 224 may include any optical elements known in the art including, but not limited to, one more or mirrors, one or more lenses, one or more polarizers, one or more beam splitters, and the like. It is noted that detector assembly 226 may include any sensor and detector assembly known in the art for detecting illumination reflected or scattered from the specimen 220.

In another embodiment, the detector assembly 226 of the optical characterization sub-system 202 is configured to collect metrology data of the specimen 220 based on illumination reflected or scattered from the specimen 220. In another embodiment, the detector assembly 226 is configured to transmit collected/acquired images and/or metrology data to the controller 204.

As noted previously herein, the controller 204 of system 200 may include one or more processors 206 and memory 208. The memory 208 may include program instructions configured to cause the one or more processors 206 to carry out various steps of the present disclosure. In one embodiment, the program instructions are configured to cause the one or more processors 206 to adjust one or more characteristics of the optical characterization sub-system 202 in order to perform one or more measurements of the specimen 220.

In additional and/or alternative embodiments, the characterization sub-system 202 may include a charged particle-based characterization sub-system 202. For example, the characterization sub-system 202 may include an SEM characterization sub-system, as illustrated in FIG. 6B.

FIG. 6B illustrates a system 200 for adaptive region of interest (ROI) selection, in accordance with one or more embodiments of the present disclosure. In particular, FIG. 6B illustrates a system 200 including an SEM characterization sub-system 202b.

In one embodiment, the SEM characterization sub-system 202b is configured to perform one or more measurements on the specimen 220. In this regard, the SEM characterization sub-system 202b may be configured to acquire one or more images of the specimen 220. The SEM characterization sub-system 202b may include, but is not limited to, electron beam source 228, one or more electron-optical elements 230, one or more electron-optical elements 232, and an electron detector assembly 234 including one or more electron sensors 236.

In one embodiment, the electron beam source 228 is configured to direct one or more electron beams 229 to the specimen 220. The electron beam source 228 may form an electron-optical column. In another embodiment, electron beam source 228 includes one or more additional and/or alternative electron-optical elements 230 configured to focus and/or direct the one or more electron beams 229 to the surface of the specimen 220. In another embodiment, SEM characterization sub-system 202b includes one or more electron-optical elements 232 configured to collect secondary and/or backscattered electrons 231 emanated from the surface of the specimen 220 in response to the one or more electron beams 229. It is noted herein that the one or more electron-optical elements 230 and the one or more electron-optical elements 232 may include any electron-optical elements configured to direct, focus, and/or collect electrons including, but not limited to, one or more deflectors, one or more electron-optical lenses, one or more condenser lenses (e.g., magnetic condenser lenses), one or more objective lenses (e.g., magnetic condenser lenses), and the like.

It is noted that the electron optical assembly of the SEM characterization sub-system 202b is not limited to the electron-optical elements depicted in FIG. 6B, which are provided merely for illustrative purposes. It is further noted that the system 200 may include any number and type of electron-optical elements necessary to direct/focus the one or more electron beams 229 onto the specimen 220 and, in response, collect and image the emanated secondary and/or backscattered electrons 231 onto the electron detector assembly 234.

For example, the system 200 may include one or more electron beam scanning elements (not shown). For instance, the one or more electron beam scanning elements may include, but are not limited to, one or more electromagnetic scanning coils or electrostatic deflectors suitable for controlling a position of the one or more electron beams 229 relative to the surface of the specimen 220. Further, the one or more scanning elements may be utilized to scan the one or more electron beams 229 across the specimen 220 in a selected pattern.

In another embodiment, secondary and/or backscattered electrons 231 are directed to one or more sensors 236 of the electron detector assembly 234. The electron detector assembly 234 of the SEM characterization sub-system 202b may include any electron detector assembly known in the art suitable for detecting backscattered and/or secondary electrons 231 emanating from the surface of the specimen 220. In one embodiment, the electron detector assembly 234 includes an electron detector array. In this regard, the electron detector assembly 234 may include an array of electron-detecting portions. Further, each electron-detecting portion of the detector array of the electron detector assembly 234 may be positioned so as to detect an electron signal from specimen 220 associated with one of the incident one or more electron beams 229. In this regard, each channel of the electron detector assembly 234 may correspond to an electron beam 229 of the one or more electron beams 229. The electron detector assembly 234 may include any type of electron detector known in the art. For example, the electron detector assembly 234 may include a micro-channel plate (MCP), a PIN or p-n junction detector array, such as, but not limited to, a diode array or avalanche photo diodes (APDs). By way of another example, the electron detector assembly 234 may include a high-speed scintillator/PMT detector.

While FIG. 6B illustrates the SEM characterization sub-system 202b as including an electron detector assembly 234 comprising only a secondary electron detector assembly, this is not to be regarded as a limitation of the present disclosure. In this regard, it is noted that the electron detector assembly 234 may include, but is not limited to, a secondary electron detector, a backscattered electron detector, and/or a primary electron detector (e.g., an in-column electron detector). In another embodiment, SEM characterization sub-system 202b may include a plurality of electron detector assemblies 234. For example, system 200 may include a secondary electron detector assembly 234a, a backscattered electron detector assembly 234b, and an in-column electron detector assembly 234c.

In one embodiment, the one or more processors 206 are configured to analyze the output of detector assembly 226/electron detector assembly 234. In one embodiment, the set of program instructions are configured to cause the one or more processors 206 to analyze one or more characteristics of specimen 220 based on images received from the detector assembly 226/electron detector assembly 234. In another embodiment, the set of program instructions are configured to cause the one or more processors 206 to modify one or more characteristics of system 200 in order to maintain focus on the specimen 220 and/or the detector assembly 226/electron detector assembly 234. For example, the one or more processors 206 may be configured to adjust one or more characteristics of the illumination source 212/electron beam source 228 and/or other elements of system 200 in order to focus the illumination 201 and/or one or more electron beams 229 onto the surface of the specimen 220. By way of another example, the one or more processors 206 may be configured to adjust the one or more elements of system 200 in order to collect illumination and/or secondary electrons 231 from the surface of the specimen 220 and focus the collected illumination on the detector assembly 226/electron detector assembly 234. By way of another example, the one or more processors 206 may be configured to adjust one or more focusing voltages applied to one or more electrostatic deflectors of electron beam source 228 in order to independently adjust the position or alignment of the one or more electron beams 229 and scan the electron beams 229 across the specimen 220.

In one embodiment, the one or more processors 206 may be communicatively coupled to memory 208, wherein the one or more processors 206 are configured to execute a set of program instructions stored on memory 208, the set of program instructions configured to cause the one or more processors 206 to carry out various functions and steps of the present disclosure.

In another embodiment, as shown in FIG. 5 and in FIGS. 6A-6B, system 200 includes a user interface 210 communicatively coupled to the controller 204. In another embodiment, the user interface 210 includes a user input device and a display. The user input device of the user interface 210 may be configured to receive one or more input commands from a user, the one or more input commands configured to input data into system 200 and/or adjust one or more characteristics of system 200. For example, as will be described in further detail herein, the user input device of the user interface 210 may be configured to receive one or more POI and/or ROI selections from a user. In another embodiment, the display of the user interface 210 may be configured to display data of system 200 to a user.

As noted previously herein, the one or more processors 206 may be communicatively coupled to memory 208, wherein the one or more processors 206 are configured to execute a set of program instructions stored in memory 208, the set of program instructions configured to cause the one or more processors 206 to carry out various functions and steps of the present disclosure. In this regard, the controller 204 may be configured to: receive one or more training images of a specimen 220 from the characterization sub-system 202; receive one or more training region-of-interest (ROI) selections within the one or more training images; generating a machine learning classifier based on the one or more training images and the one or more training ROI selections; receive one or more product images of a specimen 220 from the characterization sub-system 202; generate one or more classified regions of interest with the machine learning classifier; and determine one or more measurements of the specimen 220 within the one or more classified regions of interest. Each of these steps will be addressed in turn.

Figure 7B:
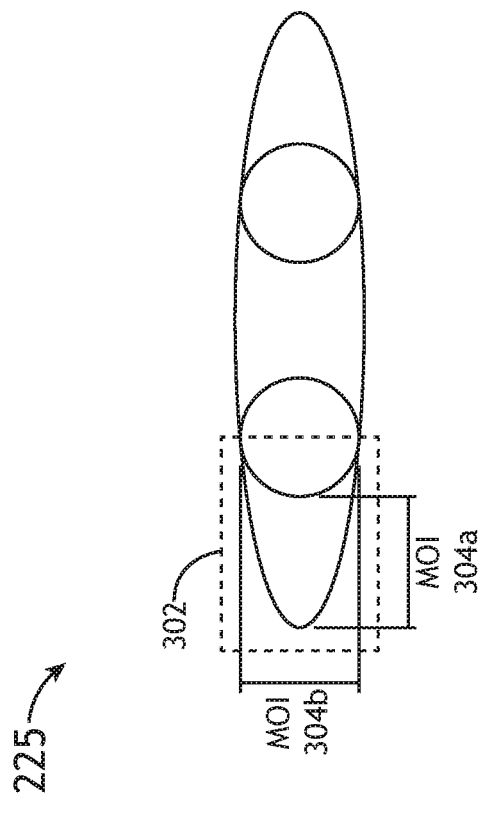
FIG. 7B illustrates a training image including a training region of interest (ROI) selection, in accordance with one or more embodiments of the present disclosure.
Figure 7A:
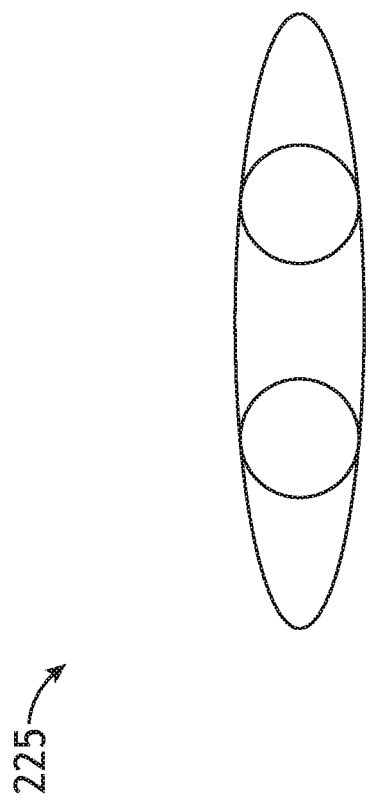
FIG. 7A illustrates a training image for training a machine learning classifier, in accordance with one or more embodiments of the present disclosure.

In one embodiment, the controller 204 of system 200 is configured to receive one or more training images 225 of a specimen 220 from the characterization sub-system 202. For the purposes of the present disclosure, the term "training images" may be regarded as images which will be used as inputs to train a machine learning classifier. FIG. 7A illustrates a training image 225 for training a machine learning classifier, in accordance with one or more embodiments of the present disclosure. For example, as shown in FIG. 6A, the controller 204 may be configured to receive one or more optical training images 225 of the specimen 220 from the optical characterization sub-system 202a. By way of another example, as shown in FIG. 6B, the controller 204 may be configured to receive one or more SEM training images 225 of the specimen 220 from the SEM characterization sub-system 202b. In this regard, the training image 225 depicted in FIG. 7A may include an optical training image 225, an SEM training image 225, and the like. In additional and/or alternative embodiments, the controller 204 may be configured to receive one or more training images 225 from a source other than the one or more characterization sub-systems 202. For example, the controller 204 may be configured to receive one or more training images 225 of a specimen 220 from an external storage device. In another embodiment, controller 204 may be further configured to store received training images 225 in memory 208.

In another embodiment, the controller 204 is configured receive one or more training region-of-interest (ROI) selections within the one or more training images 225. FIG. 7B illustrates a training image 225 including a training ROI selection 302. In one embodiment, the one or more received training ROI selections 302 may include one or more measurements of interest. For example, as shown in FIG. 7B, a training ROI selection 302 may include a first measurement of interest (MOI 304a) indicating a length of the left lobe, and a second measurement of interest (MOI 304b) indicating a height of the left lobe. These measurements of interest (MOI 304a, MOI 304b) may include critical dimensions which may be desirable to monitor throughout a fabrication process in order to ensure critical dimension uniformity (CDU). Measurements of interest (MOI 304) within the one or more training ROI selections 302 may include any feature which may be measured on a pattern, structure, or the like.

The one or more training ROI selections 302 may be received using any technique known in the art. For example, program instructions stored in memory 208 may be configured to automatically select one or more training ROI selections 302. By way of another example, the one or more training ROI selections 302 may be received via the user interface 210. For instance, a display device of the user interface 210 may display one or more training images 225 to a user. The user may then input, via a user input device of the user interface 210, one or more input commands indicative of one or more training ROI selections 302. In this regard, in some embodiments, a user may manually draw/select one or more training ROI selections 302 within a training image 225 via the user interface 210. In another embodiment, the controller 204 is configured to store the one or more training ROI selections 302 in memory 208.

In another embodiment, the controller 204 is configured to generate a machine learning classifier based on the one or more training images 225 and the one or more training ROI selections 302. The machine learning classifier may include any type of machine learning algorithm/classifier and/or deep learning technique or classifier known in the art including, but not limited to, a convolutional neural network (CNN) (e.g., GoogleNet, AlexNet, and the like), an ensemble learning classifier, a random forest classifier, artificial neural network (ANN), and the like.

Training the machine learning classifier may include teaching the machine learning classifier to identify the one or more measurements of interest (MOI 304a, 304b) and/or features of interest to be measured based on the received training images 225 and training ROI selections 302. As it is used herein, the term "measurement of interest" (MOI 304a, 304b) may be regarded as referring to any measurement which may be desired to be performed on the specimen 220. In this regard, the machine learning classifier may be trained/generated such that it is configured to identify the first measurements of interest (MOI 304a) and/or the second measurement of interest (MOI 304b) based on the received training images 225 and the received training ROI selections 302.

The controller 204 may be configured to generate the machine learning classifier via supervised learning and/or unsupervised learning. It is noted herein that the machine learning classifier may include any algorithm or predictive model configured to predict and/or identify one or more measurements of interest.

Figure 8B:
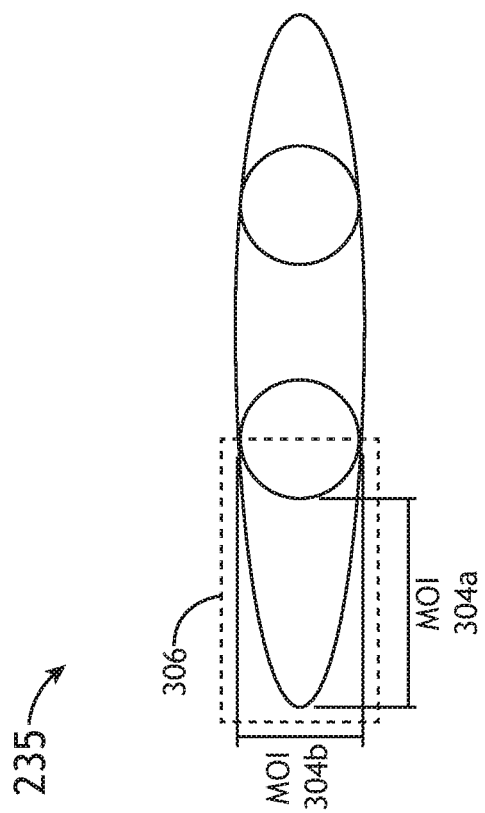
FIG. 8B illustrates a product image including a classified region of interest (ROI), in accordance with one or more embodiments of the present disclosure.
Figure 8A:
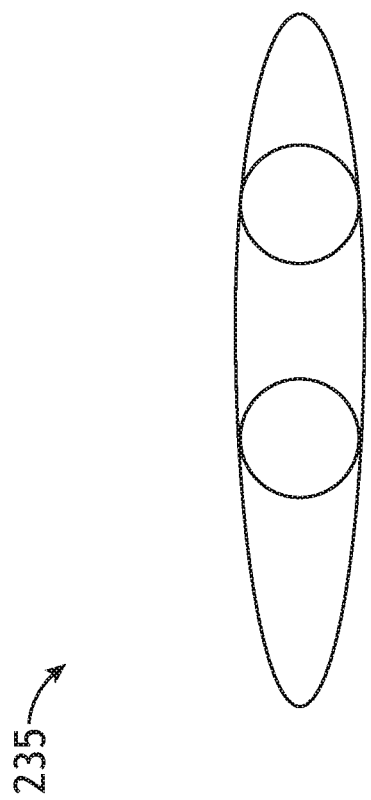
FIG. 8A illustrates a product image, in accordance with one or more embodiments of the present disclosure.

In another embodiment, the controller 204 may be configured to receive one or more product images 235 of a specimen 220 from the characterization sub-system 202. FIG. 8A illustrates a product image 235, in accordance with one or more embodiments of the present disclosure. As shown in FIG. 6A, the controller 204 may be configured to receive one or more optical product images 235 of the specimen 220 from the optical characterization sub-system 202a. By way of another example, as shown in FIG. 6B, the controller 204 may be configured to receive one or more SEM product images 235 of the specimen 220 from the SEM characterization sub-system 202b. In this regard, the product image 235 depicted in FIG. 8A may include an optical product image 235, an SEM product image 235, and the like. In additional and/or alternative embodiments, the controller 204 may be configured to receive one or more product images 235 from a source other than the one or more characterization sub-systems 202. For example, the controller 204 may be configured to receive one or more product images 235 of a specimen 220 from an external storage device. In another embodiment, controller 204 may be further configured to store received product images 235 in memory 208.

The term "product images" is used herein to describe images of a specimen 220 which include one or more measurements of interest (MOI 304). In this regard, the one or more product images 235 may include one or more images of product wafers (e.g., product specimens 220) which are to be monitored by measuring one or more measurements of interest (MOI 304). This may be carried out in order to ensure critical dimension uniformity (CDU), as described previously herein.

In another embodiment, the controller 204 is configured to generate one or more classified regions of interest with the machine learning classifier. For example, FIG. 8B illustrates a product image 235 including a classified ROI 306, in accordance with one or more embodiments of the present disclosure.

In one embodiment, the controller 204 is configured to generate the one or more classified ROIs 306 within the one or more product images 235 with the machine learning classifier. In another embodiment, the machine learning classifier may be configured to generate the one or more classified ROIs 306 within the product images 235 such that the classified ROIs 306 include one or more identified measurements of interest (MOI 304a, 304b). For example, as shown in FIG. 8B, the machine learning classifier may be configured to generate the classified ROI 306 such that the classified ROI 306 contains the first identified measurement of interest (MOI 304a) and/or the second identified measurement of interest (MOI 304b).

It is contemplated herein that generating ROIs based on machine learning algorithms (e.g., classified ROI 306) may increase the probability that the ROIs will be correctly placed such that they include intended measurements of interest. It is further contemplated herein that generating classified ROIs 306 via machine learning algorithms may provide a number of advantages over previous approaches, which place ROIs (e.g., ROI 104b in FIGS. 3B and 4B) based on conventional image processing alignment procedures. This may be illustrated by comparing the placement of the ROI 104b in FIG. 3B via conventional image processing alignment procedures, and the placement of the classified ROI 306 in FIG. 8B via a machine learning classifier. As shown in FIG. 3B, conventional image processing techniques may be unable to account for process and structural variations, which may then lead to misplacement of the ROI 104b and inability to carry out the desired measurements. Comparatively, as shown in FIG. 8B, it is contemplated herein that machine learning classifiers may be configured to identify measurements of interest (MOI 304a, 304b) such that the machine learning classifiers may generate adaptive classified ROIs 306 which may be more accurately placed to include identified measurements of interest (MOI 304a, 304b). In particular, characteristics of the classified ROIs 306 (e.g., shape, size, orientation) generated by the machine learning classifier may be modified according to the characteristics (e.g., shape, size, orientation) of relevant structures (e.g., left lobe) of the specimen 220. In this regard, by generating adaptive classified ROIs 306 which are able to vary in size, shape, orientation, and the like, embodiments of the present disclosure may provide for more accurate and reliable ROI placement.

In another embodiment, the controller is configured to generate the one or more classified ROIs 306 by adaptively modifying one or more characteristics of one or more product ROI selections with the machine learning classifier. In this regard, generating one or more classified ROIs 306 with the machine learning classifier may include receiving one or more product ROI selections 305 within the one or more product images 235, and adaptively modifying one or more characteristics of one or more product ROI selections 305 with the machine learning classifier to generate the one or more classified ROIs 306. This may be further understood with reference to FIG. 8C.

Figure 8C:
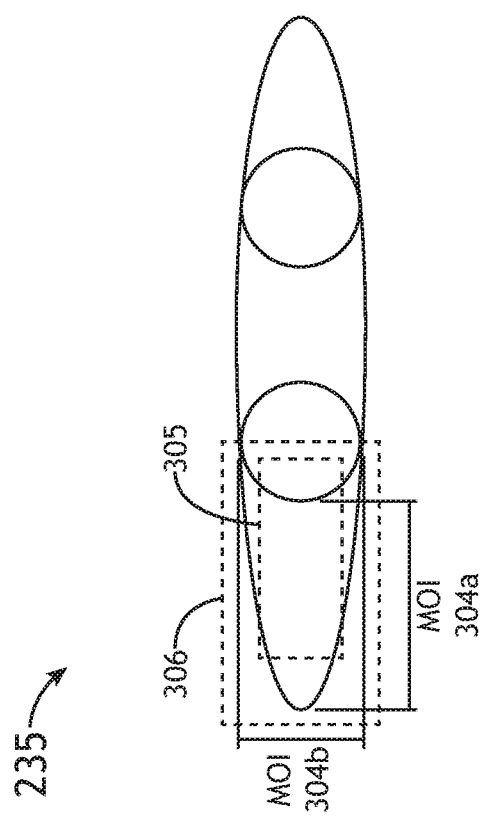
FIG. 8C illustrates a product image including a product region of interest (ROI) selection and a classified region of interest, in accordance with one or more embodiments of the present disclosure.

FIG. 8C illustrates a product image 235 including a product ROI selection 305 and a classified ROI 306, in accordance with one or more embodiments of the present disclosure. In this example, the controller 204 may receive a product ROI selection 305 indicative of a region of the product image 235. For instance, a user may input the product ROI selection 305 via the user interface 210. Continuing with the same example, the controller 204 may be configured to adaptively modify one or more characteristics of the product ROI selection 305 with the machine learning classifier to generate the classified ROI 306. Characteristics of the product ROI selection 305 which may be adaptively modified by the machine learning classifier to generate the classified ROI 306 may include, but are not limited to, size, shape, orientation, and the like.

It is contemplated herein that generating the classified ROIs 306 by modifying received product ROI selections 305 may allow for the machine learning classifier to serve as a corrective tool which is activated on an as-needed basis. For example, in some embodiments, the machine learning classifier may only generate the classified ROI 306 by adaptively modifying a product ROI selection 305 when the received product ROI selection 305 is incorrectly placed (e.g., placed such that it fails to include the one or more MOIs 304a, 304b), as shown in FIG. 8C.

In one embodiment, the machine learning classifier may adaptively modify one or more characteristics of the one or more product ROI selections 305 based on one or more characteristics of a structure within the one or more product images 235. For example, as shown in FIG. 8C, the machine learning classifier may adaptively modify the product ROI selection 305 based on a structural variation of the left lobe. In another embodiment, the machine learning classifier may adaptively modify one or more characteristics of the one or more product ROI selections 305 in response to one or more process variations. In this regard, the machine learning classifier may adaptively modify the product ROI selection 305 in order to correct for one or more process variations.

Similarly, in another embodiment, generation of the classified ROI 306 may be assisted by receiving one or more product POI selections (not shown). For example, similar to traditional approaches, the controller 204 may receive a product POI selection within a product image 235, and then generate one or more classified ROIs 306 based, at least in part, on the one or more received POI selections.

Figure 9B:
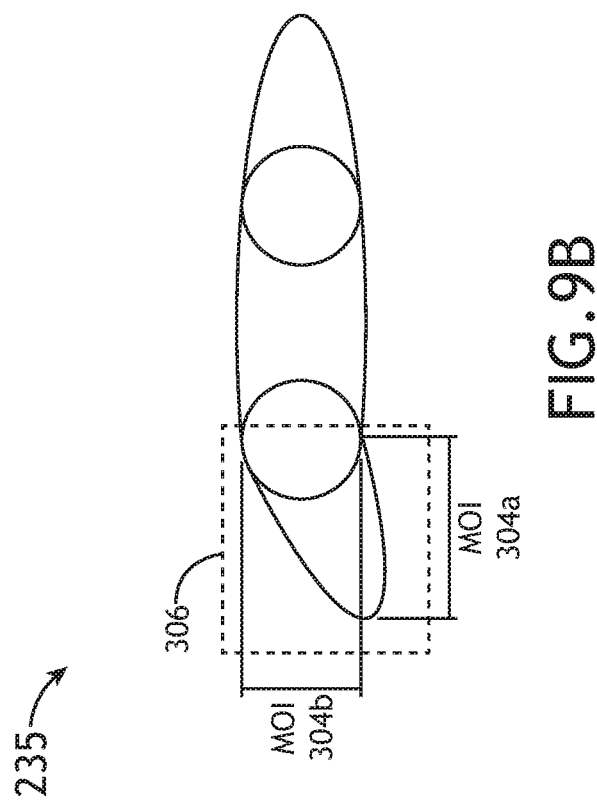
FIG. 9B illustrates a product image including a classified region of interest (ROI), in accordance with one or more embodiments of the present disclosure.
Figure 9A:
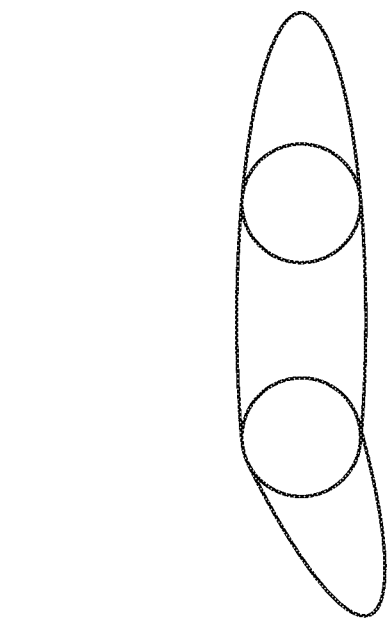
FIG. 9A illustrates a product image, in accordance with one or more embodiments of the present disclosure.

FIG. 9A illustrates a product image 235, in accordance with one or more embodiments of the present disclosure. FIG. 9B illustrates a product image 235 including a classified region of interest (ROI) 306, in accordance with one or more embodiments of the present disclosure. In one embodiment, the machine learning classifier may generate one or more classified ROIs 306 such that the one or more classified ROIs 306 include one or more identified MOIs 304a, 304b. Comparing the placement of the ROI 104b in FIG. 4B against the classified ROI 306 in FIG. 9B, it may be seen that ROI placement via a machine learning classifier may provide for improved ROI placement over conventional image processing alignment procedures. Accordingly, it is contemplated herein that embodiments of the present disclosure may provide for more accurate and reliable ROI placement which are less susceptible and/or immune to structural/process variations. In particular, it is contemplated herein that the increased adaptability of classified ROIs 306 may be especially beneficial in the context of semiconductor fabrication ramp-ups.

Figure 9C:
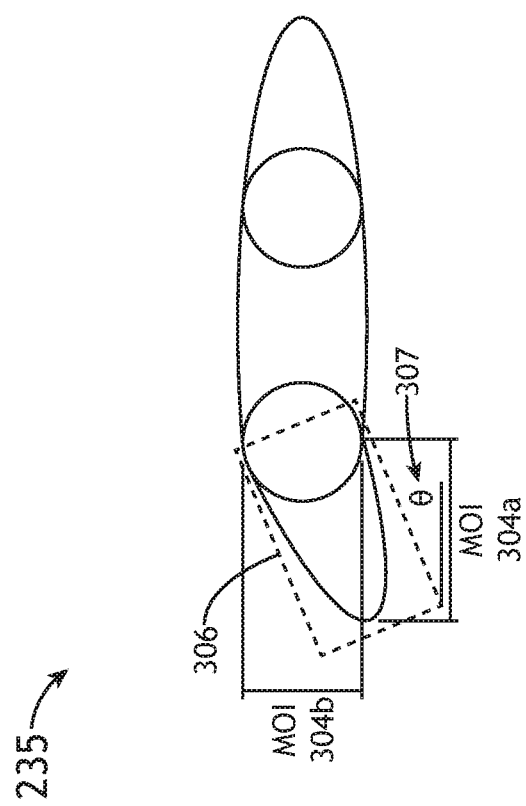
FIG. 9C illustrates a product image including an angular classified region of interest (ROI), in accordance with one or more embodiments of the present disclosure.

FIG. 9C illustrates a product image 235 including an angular classified region of interest (ROI) 306, in accordance with one or more embodiments of the present disclosure.

In one embodiment, as shown in FIG. 9C, the machine learning classifier may be configured to generate one or more angular classified ROIs 306. The term "angular" may be used herein to describe a classified ROI 306 which is oriented at an offset angle 307 (defined by $\theta$) with respect to a particular frame or object of reference. For example, an angular classified ROI 306 may be rotated with respect to a product ROI selection 305 such that the angular classified ROI 306 is disposed at an offset angle 307 with respect to the product ROI selection 305. By way of another example, as shown in FIG. 9C, an angular classified ROI 306 may be rotated such that the angular classified ROI 306 is disposed at an offset angle 307 with respect to an edge or border of the product image 235, as shown in FIG. 9C.

It is noted herein that it may be extremely difficult, or even impossible, to generate angular ROIs 104 with conventional image processing procedures. For example, where only a portion of a structure has been rotated, such as in FIG. 9C, conventional image processing procedures may be unable to generate and accurately align an angular ROI 104. Additionally, even where angular ROIs 104 may potentially be generated by conventional image processing procedures, the process may be so computationally expensive as to make it impracticable and inefficient. Accordingly, it is contemplated herein that the ability to generate angular classified ROIs 306 with machine learning classifiers may provide for more accurate ROI placement for varying structures, and enable more complex and intricate critical dimension measurements.

In another embodiment, the controller 204 may be configured to determine one or more measurements of the specimen 220 within the one or more classified ROIs 306. For example, as shown in FIG. 8B, the controller 204 may be configured to measure a first critical dimension indicated by the first measurement of interest (MOI 304a) and a second critical dimension indicated by the second measurement of interest (MOI 304b). The one or more measurements made within the one or more classified ROIs 306 may include any measurements known in the art including, but not limited to, critical dimension (CD) measurements.

It is noted herein that the one or more components of system 200 may be communicatively coupled to the various other components of system 200 in any manner known in the art. For example, the one or more processors 206 may be communicatively coupled to each other and other components via a wireline (e.g., copper wire, fiber optic cable, and the like) or wireless connection (e.g., RF coupling, IR coupling, WiMax, Bluetooth, 3G, 4G, 4G LTE, 5G, and the like). By way of another example, the controller 204 may be communicatively coupled to one or more components of characterization sub-system 202 via any wireline or wireless connection known in the art.

In one embodiment, the one or more processors 206 may include any one or more processing elements known in the art. In this sense, the one or more processors 206 may include any microprocessor-type device configured to execute software algorithms and/or instructions. In one embodiment, the one or more processors 206 may consist of a desktop computer, mainframe computer system, workstation, image computer, parallel processor, or other computer system (e.g., networked computer) configured to execute a program configured to operate the system 200, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 206. In general, the term "processor" may be broadly defined to encompass any device having one or more processing elements, which execute program instructions from memory 208. Moreover, different subsystems of the system 200 (e.g., illumination source 212, electron beam source 228, detector assembly 226, electron detector assembly 234, controller 204, user interface 210, and the like) may include processor or logic elements suitable for carrying out at least a portion of the steps described throughout the present disclosure. Therefore, the above description should not be interpreted as a limitation on the present disclosure but merely an illustration.

The memory 208 may include any storage medium known in the art suitable for storing program instructions executable by the associated one or more processors 206 and the data received from the characterization sub-system 202. For example, the memory 208 may include a non-transitory memory medium. For instance, the memory 208 may include, but is not limited to, a read-only memory (ROM), a random-access memory (RAM), a magnetic or optical memory device (e.g., disk), a magnetic tape, a solid-state drive and the like. It is further noted that memory 208 may be housed in a common controller housing with the one or more processors 206. In an alternative embodiment, the memory 208 may be located remotely with respect to the physical location of the processors 206, controller 204, and the like. In another embodiment, the memory 208 maintains program instructions for causing the one or more processors 206 to carry out the various steps described through the present disclosure.

In one embodiment, a user interface 210 is communicatively coupled to the controller 204. In one embodiment, the user interface 210 may include, but is not limited to, one or more desktops, tablets, smartphones, smart watches, or the like. In another embodiment, the user interface 210 includes a display used to display data of the system 200 to a user. The display of the user interface 210 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 210 is suitable for implementation in the present disclosure. In another embodiment, a user may input selections and/or instructions responsive to data displayed to the user via a user input device of the user interface 210.

Figure 10:
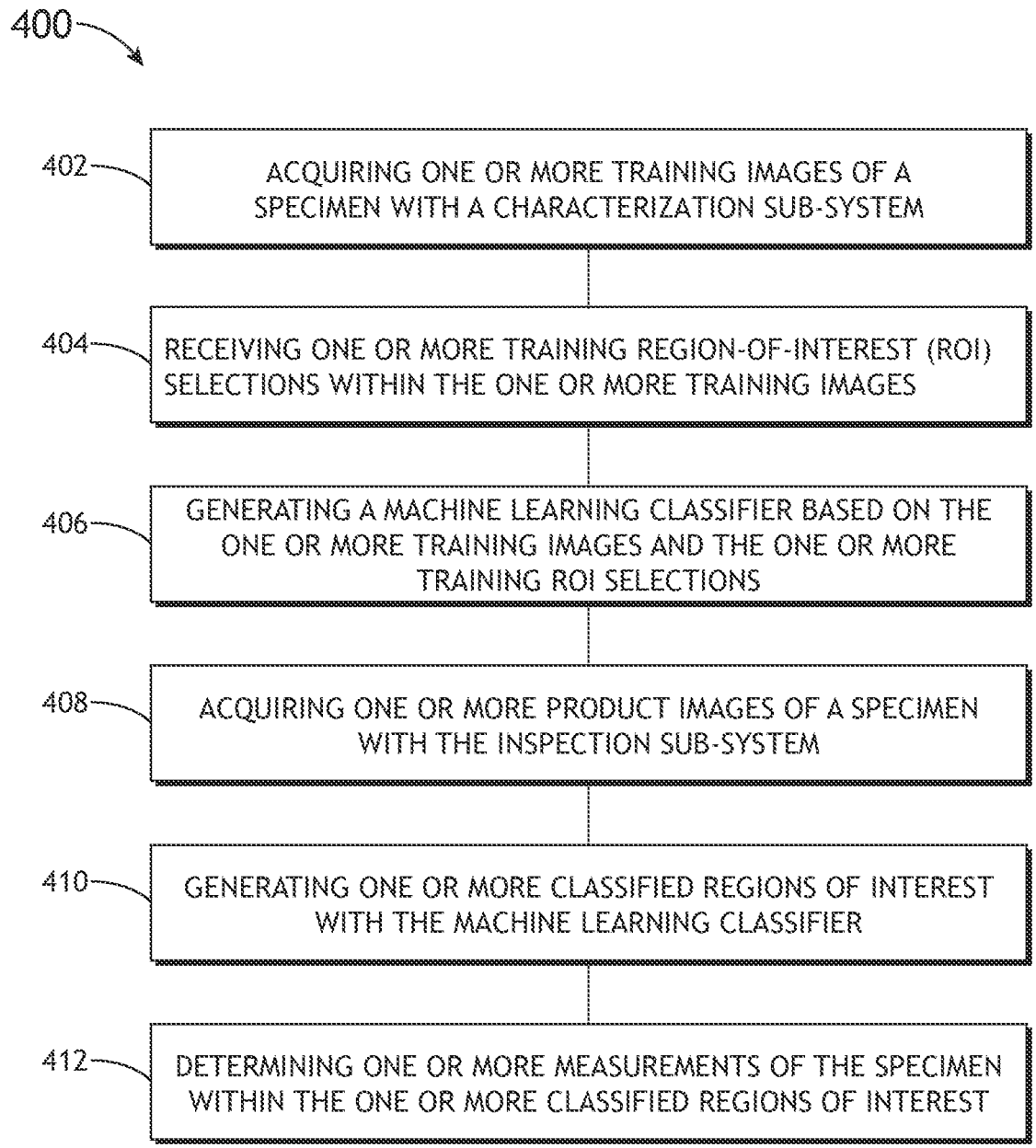
FIG. 10 illustrates a flowchart of a method for adaptive region of interest (ROI) selection, in accordance with one or more embodiments of the present disclosure.

FIG. 10 illustrates a flowchart of a method 400 for adaptive region of interest (ROI) selection, in accordance with one or more embodiments of the present disclosure. It is noted herein that the steps of method 400 may be implemented all or in part by system 200. It is further recognized, however, that the method 400 is not limited to the system 200 in that additional or alternative system-level embodiments may carry out all or part of the steps of method 400.

In a step 402, one or more training images of a specimen are acquired with a characterization sub-system. For example, as shown in FIGS. 6A-6B, an optical characterization sub-system 202a and/or an SEM characterization sub-system 202b may be configured to acquire one or more training images 225 of a specimen 220 and transmit the one or more acquired training images 225 to a controller 204.

In a step 404, one or more training ROI selections are received. For example, as shown in FIGS. 7A-7B, the controller 204 may receive one or more training ROI selections 302 within the one or more training images 225. The one or more training ROI selections 302 may include one or more measurements of interest (MOI 304a, 304b). The one or more training ROI selections 302 may be received using any technique known in the art. For example, program instructions stored in memory 208 may be configured to automatically select one or more training ROI selections 302. By way of another example, the one or more training ROI selections 302 may be received via the user interface 210. For instance, a display device of the user interface 210 may display one or more training images 225 to a user. The user may then input, via a user input device of the user interface 210, one or more input commands indicative of one or more training ROI selections 302.

In a step 406, a machine learning classifier is generated based on the one or more training images and the one or more training ROI selections. Training the machine learning classifier may include teaching the machine learning classifier to identify the one or more measurements of interest (MOI 304a, 304b) and/or features of interest to be measured based on the received training images 225 and training ROI selections 302. The machine learning classifier may include any type of machine learning algorithm/classifier and/or deep learning technique or classifier known in the art including, but not limited to, a deep learning classifier, a convolutional neural network (CNN) (e.g., GoogleNet, AlexNet, and the like), an ensemble learning classifier, a random forest classifier, artificial neural network (ANN), and the like.

In a step 408, one or more product images of a specimen are acquired with the characterization sub-system. For example, as shown in FIGS. 6A-6B, an optical characterization sub-system 202a and/or an SEM characterization sub-system 202b may be configured to acquire one or more product images 235 of a specimen 220 and transmit the one or more acquired product images 235 to the controller 204. The one or more product images 235 may include one or more images of product wafers (e.g., product specimens 220) which are to be monitored by measuring one or more measurements of interest (MOI 304). This may be carried out in order to ensure critical dimension uniformity (CDU), as described previously herein.

In a step 410, one or more classified ROIs are generated with the machine learning classifier. For example, as shown in FIGS. 8B and 9B, the machine learning classifier may be configured to generate the classified ROI 306 such that the classified ROI 306 contains the first identified measurement of interest (MOI 304a) and/or the second identified measurement of interest (MOI 304b).

In a step 412, one or more measurements of the specimen are determined within the one or more classified regions of interest. For example, as shown in FIG. 8B, the controller 204 may be configured to measure a first critical dimension indicated by the first measurement of interest (MOI 304a) and a second critical dimension indicated by the second measurement of interest (MOI 304b). The one or more measurements made within the one or more classified ROIs 306 may include any measurements known in the art including, but not limited to, critical dimension (CD) measurements.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system comprising:
   a characterization sub-system configured to acquire one or more images of a specimen, the characterization sub-system including an illumination source and a detector assembly; and
   a controller including one or more processors configured to execute a set of program instructions stored in memory, the set of program instructions configured to cause the one or more processors to:
      receive one or more training images of a specimen from the characterization sub-system;
      receive one or more training region-of-interest (ROI) selections within the one or more training images;
      generate a machine learning classifier based on the one or more training images and the one or more training ROI selections, wherein the machine learning classifier is configured to identify one or more measurements of interest of a specimen based on the one or more training images and the one or more training ROI selections;
      receive one or more product images of a specimen from the characterization sub-system;
      generate one or more classified regions of interest with the machine learning classifier; and
      determine one or more measurements of the specimen within the one or more classified regions of interest.

2. The system of claim 1, wherein the generating one or more classified regions of interest with the machine learning classifier comprises:
   receiving one or more product ROI selections within the one or more product images;
   adaptively modifying one or more characteristics of the one or more product ROI selections with the machine learning classifier to generate the one or more classified regions of interest.

3. The system of claim 2, wherein at least one product ROI selection is received from a user via a user interface.

4. The system of claim 2, wherein the adaptively modifying one or more characteristics of the one or more product ROI selections with the machine learning classifier comprises:
   adaptively modifying at least one of a size or a shape of at least one product ROI selection with the machine learning classifier.

5. The system of claim 2, wherein the adaptively modifying one or more characteristics of the one or more product ROI selections with the machine learning classifier comprises:
   adaptively modifying an orientation of at least one product ROI selection with the machine learning classifier to generate a classified region of interest which has been rotated with respect to the at least one product ROI selection.

6. The system of claim 1, wherein the generating one or more classified regions of interest with the machine learning classifier comprises:
   receiving one or more product pattern of interest (POI) selections within the one or more product images; and
   generating the one or more classified regions of interest based on the one or more product POI selections.

7. The system of claim 1, wherein the one or more measurements comprise a critical dimension measurement within the one or more classified regions of interest.

8. The system of claim 1, wherein the characterization sub-system comprises at least one of a scanning electron microscopy (SEM) sub-system or an optical characterization sub-system.

9. The system of claim 1, wherein at least one training ROI selection is received from a user via a user interface.

10. The system of claim 1, wherein the machine learning classifier comprises at least one of a deep learning classifier, a convolutional neural network (CNN), an ensemble learning classifier, a random forest classifier, or an artificial neural network.

11. A system comprising:
a controller including one or more processors configured to execute a set of program instructions stored in memory, the set of program instructions configured to cause the one or more processors to:
receive one or more training images of a specimen;
receive one or more training region-of-interest (ROI) selections within the one or more training images;
generating a machine learning classifier based on the one or more training images and the one or more training ROI selections, wherein the machine learning classifier is configured to identify one or more measurements of interest of a specimen based on the one or more training images and the one or more training ROI selections;
receive one or more product images of a specimen;
generate one or more classified regions of interest with the machine learning classifier; and
determine one or more measurements of the specimen within the one or more classified regions of interest.

12. The system of claim 11, wherein the generating one or more classified regions of interest with the machine learning classifier comprises:
receiving one or more product ROI selections within the one or more product images; and
adaptively modifying one or more characteristics of the one or more product ROI selections with the machine learning classifier to generate one or more modified regions of interest.

13. The system of claim 12, wherein the adaptively modifying one or more characteristics of the one or more product ROI selections with the machine learning classifier comprises:
adaptively modifying at least one of a size or a shape of at least one product ROI selection with the machine learning classifier.

14. The system of claim 12, wherein the adaptively modifying one or more characteristics of the one or more product ROI selections with the machine learning classifier to generate one or more modified regions of interest comprises:
adaptively modifying an orientation of at least one product ROI selection with the machine learning classifier to generate a classified region of interest which has been rotated with respect to the at least one product ROI selection.

15. The system of claim 11, wherein the one or more measurements comprise a critical dimension measurement within the one or more classified regions of interest.

16. The system of claim 11, wherein at least one training ROI selection is received from a user input device of a user interface.

17. The system of claim 11, wherein the machine learning classifier comprises at least one of a deep learning classifier, a convolutional neural network (CNN), an ensemble learning classifier, a random forest classifier, or an artificial neural network.

18. A method comprising:
acquiring one or more training images of a specimen with a characterization sub-system;
receiving one or more training region-of-interest (ROI) selections within the one or more training images;
generating a machine learning classifier based on the one or more training images and the one or more training ROI selections, wherein the machine learning classifier identifies one or more measurements of interest of a specimen based on the one or more training images and the one or more training ROI selections;
acquiring one or more product images of a specimen with the characterization sub-system;
generating one or more classified regions of interest with the machine learning classifier; and
determining one or more measurements of the specimen within the one or more classified regions of interest.

* * * * *